United States Patent
Vidal et al.

(10) Patent No.: US 10,674,207 B1
(45) Date of Patent: Jun. 2, 2020

(54) DYNAMIC MEDIA PLACEMENT IN VIDEO FEED

(71) Applicant: ACCENTURE GLOBAL SOLUTIONS LIMITED, Dublin (IE)

(72) Inventors: Richard Vidal, Antibes (FR); Edouard Mathon, Bretteville (FR); Christian Souche, Cannes (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/242,891

(22) Filed: Jan. 8, 2019

(30) Foreign Application Priority Data

Dec. 20, 2018 (EP) ..................................... 18214595

(51) Int. Cl.
*H04N 21/442* (2011.01)
*H04N 21/2187* (2011.01)
(Continued)

(52) U.S. Cl.
CPC ... *H04N 21/44209* (2013.01); *H04N 21/2187* (2013.01); *H04N 21/23424* (2013.01);
(Continued)

(58) Field of Classification Search
CPC ........... H04N 21/44209; H04N 21/812; H04N 21/44016; H04N 21/4223; H04N 21/23424; H04N 21/2187; H04N 21/2668; H04N 21/4532; H04N 21/4316; H04N 21/458; H04N 21/23412; H04N 21/2365
(Continued)

(56) References Cited

U.S. PATENT DOCUMENTS

| | | | | |
|---|---|---|---|---|
| 5,808,695 | A | * | 9/1998 | Rosser .................... G06T 7/248 348/135 |
| 5,892,554 | A | * | 4/1999 | DiCicco ............... H04N 5/2723 348/584 |

(Continued)

FOREIGN PATENT DOCUMENTS

WO   2015/047246   4/2015

OTHER PUBLICATIONS

Fanman Meng et al., "From Logo to Object Segmentation", IEEE Transactions on Multimedia, vol. 15, No. 8, pp. 2186-2197.
(Continued)

*Primary Examiner* — Cynthia M Fogg
(74) *Attorney, Agent, or Firm* — Mannava & Kang, PC (57) ABSTRACT

A system for placement of media object in a video feed comprises a receiver to receive the video feed, a tracker to receive a camera tracking data regarding movement of a camera capturing the video feed, a detector to detect a placeholder within the video feed where the media object may be placed and detect an attribute, such as size and position of the placeholder, and a media obtainer to obtain information regarding the media object, the media object having a placement attribute corresponding to the placeholder. The system also comprises an aligner to adjust the placement attribute of the media object with the attribute of the placeholder for positioning the media object within the placeholder, and a content generator to generate a content indicative of the media object embedded within the placeholder of the video feed.

20 Claims, 6 Drawing Sheets

(51) Int. Cl.
*H04N 21/234* (2011.01)
*H04N 21/44* (2011.01)
*H04N 21/81* (2011.01)
*H04N 21/4223* (2011.01)

(52) U.S. Cl.
CPC ... *H04N 21/4223* (2013.01); *H04N 21/44016* (2013.01); *H04N 21/812* (2013.01)

(58) Field of Classification Search
USPC .......................................................... 725/14
See application file for complete search history.

(56) References Cited

U.S. PATENT DOCUMENTS

| | | | | |
|---|---|---|---|---|
| 6,100,925 | A * | 8/2000 | Rosser | G01S 3/7864 348/169 |
| 7,908,172 | B2 | 3/2011 | Corts et al. | |
| 8,910,201 | B1 * | 12/2014 | Zamiska | H04N 21/44222 725/34 |
| 9,424,494 | B1 | 8/2016 | Lineback et al. | |
| 2002/0078446 | A1 | 6/2002 | Dakss et al. | |
| 2002/0144262 | A1 * | 10/2002 | Plotnick | G11B 27/005 725/32 |
| 2007/0100698 | A1 * | 5/2007 | Neiman | G06Q 30/0247 705/14.46 |
| 2008/0046499 | A1 | 2/2008 | Cabrera et al. | |
| 2008/0101456 | A1 * | 5/2008 | Ridge | H04N 5/262 375/240.01 |
| 2008/0184288 | A1 | 7/2008 | Lipscomb | |
| 2008/0249986 | A1 | 10/2008 | Clarke-Martin | |
| 2009/0019487 | A1 | 1/2009 | Kulas | |
| 2009/0092374 | A1 | 4/2009 | Kulas | |
| 2010/0064025 | A1 | 3/2010 | Nelimarkka et al. | |
| 2010/0154007 | A1 | 6/2010 | Touboul et al. | |
| 2011/0177775 | A1 | 7/2011 | Gupta et al. | |
| 2012/0253937 | A1 | 10/2012 | Wing et al. | |
| 2013/0091519 | A1 | 4/2013 | McLauchlan et al. | |
| 2013/0304604 | A1 * | 11/2013 | Hoffman | G06Q 30/0621 705/26.5 |
| 2014/0140680 | A1 | 5/2014 | Jo | |
| 2014/0259056 | A1 | 9/2014 | Grusd | |
| 2014/0282724 | A1 | 9/2014 | Chalozin et al. | |
| 2015/0138238 | A1 * | 5/2015 | Wagg | G06T 11/60 345/634 |
| 2015/0264416 | A1 | 9/2015 | Heinz et al. | |
| 2015/0339838 | A1 * | 11/2015 | Friedman | G06K 19/06103 345/641 |
| 2015/0363635 | A1 | 12/2015 | Suri et al. | |
| 2016/0034786 | A1 | 2/2016 | Suri et al. | |
| 2016/0212455 | A1 | 7/2016 | Manna | |
| 2017/0062009 | A1 | 3/2017 | Clifton et al. | |
| 2019/0220652 | A1 | 7/2019 | Li et al. | |

OTHER PUBLICATIONS

Kang Kai et al., "Object Detection from Video Tubelets with Convolutional Neural Networks", 2016 IEEE Conference on Computer Vision and Pattern Recognition (CVPR), IEEE, Jun. 27, 2016, pp. 817-825.
Wenguan Wang et al., "A Unified Spatiotemporal Prior based on Geodesic Distance for Video Object Segmentation", IEEE Transactions on Pattern Analysis and Machine Intelligence, Jan. 31, 2017, pp. 1-18.
Kruthiventi Srinivas SS et al., "Saliency Unified: A Deep Architecture for simultaneous Eye Fixation Prefiction and Salient Object Segmentation", 2016 IEEE Conference on Computer Vision and Pattern Recognition (CVPR), IEEE, Jun. 27, 2016, pp. 5781-5790.
Lipton AJ et al., "Moving target classification and tracking from real-time video", Applications of Computer Vision, 1998. WACV '98. Proceedings., Fourth IEEE Workshop on Princeton, NJ. USA. Oct. 19, 1998, pp. 8-14.
Ivan E. Sutherland, "Three-Dimensional Data Input by Tablet", Proceedings of the IEEE, vol. 62, No. 4, Apr. 1974, pp. 453-461.
Y.I Abdel-Aziz, et al., "Direct Linear Transformation from Comparator Coordinates into Object Space Coordinates in Close-Range Photogrammetry", Photogrammetric Engineering & Remote Sensing, vol. 81, No. 1, Feb. 2015, pp. 103-107.

* cited by examiner

DYNAMIC MEDIA PLACEMENT IN VIDEO FEED

PRIORITY CLAIM

The present application claims priority to European Patent Application Number 18214595.3 filed on Dec. 20, 2018 titled "Dynamic Media Placement in Video Feed", the disclosure of which is incorporated by reference herein.

BACKGROUND

Video programs, such as, for example, television shows, online movies and series are viewed by a large number of viewers. The viewers, based on their age groups and geographic locations, may have different preferences for the video programs. For instance, younger viewers may prefer watching entertainment-based programs and adult viewers may prefer watching live matches or news related programs.

Generally, the video programs include various media objects, such as, for example, pictures or videos related to advertisements that are shown to the viewers along with content of the video programs. An advertisement may be selected based on various factors, such as, for example, age group, geographic locations and the preferences of the viewers, and may include information related to a product or a service and a company logo. Thereafter, an appropriate area may be identified within a feed of the video program where the advertisement can be placed. The video feed may then be broadcast to the viewers with the advertisement blended in the video feed.

Existing systems for placement of media objects within the video feed use multiple processors to analyze content of the video feed, create multiple video feeds where each video feed has the advertisement placed within the area, and then broadcast the multiple video feeds to the viewers. However, such systems are complex and costly as they require multiple processors and related hardware to process and broadcast the video feed. The systems are also inefficient in keeping the advertisement within the area of the video feed when the video feed is played and, therefore, have reduced video quality.

The present disclosure provides a technical solution to a problem to efficiently merge advertisement into the broadcast content.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for placement of media objects, such as advertisements within a video feed for broadcasting the video feed to viewers. According to an example of the present disclosure, a system may include a receiver, a tracker, a detector, a media obtainer, an aligner and a content generator. In an example embodiment, the receiver, the tracker, the detector, the media obtainer, the aligner and the content generator may be in communication with each other to perform the functionalities of the system.

The receiver may receive, but is not limited to, a video feed having multiple objects. The video feed may be, for instance, of a live match played between two teams at a playground and may be captured by multiple cameras at the location. The multiple cameras may be moved, titled or zoomed for capturing different views of the match. The objects may refer to, for example, the playground, players playing the match, goal posts, banners and billboards on the playground.

The tracker may receive a camera tracking data that includes change in position and size of an object within the video feed based on movement, tilting or zooming of the multiple cameras. The change in position and size of the object may be for example, a player moving from one side of the playground to the other side, or decrease in size of the banner on the playground due to zooming out of a camera.

Upon receiving the video feed, the detector may detect a place holder within the video feed. The placeholder may be a space within the object of the video feed where a media object, such as an advertisement may be placed. In an example, the placeholder may be detected based on an alpha mask. The detector may then detect attributes, such as position, orientation, and size of the placeholder in the video feed. The detector may monitor for changes in the attributes of the placeholder in the video feed based on the camera tracking data.

In an example embodiment, the media obtainer may obtain information regarding the media object. The media object in an example may have a placement attribute corresponding to the placeholder in the video feed. The placement attribute includes a characteristic of the media object that is compatible with the placeholder.

The aligner may adjust the placement attribute of the media object with the attributes of the placeholder for positioning the media object within the placeholder. In an example, the aligner may apply the changes to the placement attribute of the media object based on a transformation matrix of position coordinates of the placeholder and the media object.

The content generator may then generate a content including the video feed with the media object embedded within the placeholder of the video feed. In an example, the video feed may have the advertisement embedded within the placeholder of the video feed where the advertisement may be kept aligned within the placeholder of the video feed when the video feed is played.

The system of the present disclosure offers an efficient technique of integrating the media object in the video feed with enhanced accuracy. Further the system provides a time-effective integration of the media object into a video feed. In addition, the quality of video with the video feed having the media object is enhanced. Therefore, the present subject matter provides a comprehensive, economic, and time-effective positioning of media objects in video feed.

Figure 1:
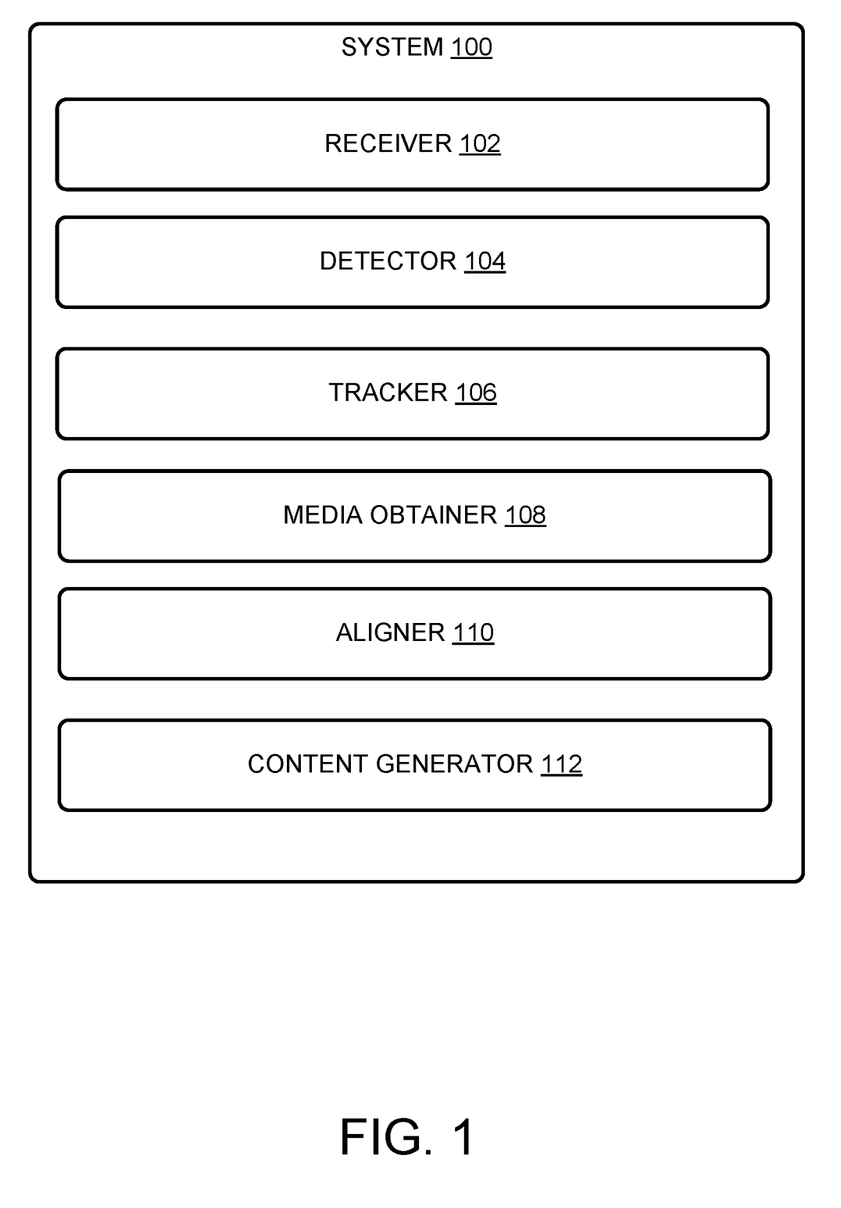
FIG. 1 illustrates a block diagram of a system 100, according to an example embodiment of the present disclosure.

FIG. 1 illustrates a schematic view of a system 100 for placement of media object, such as an advertisement in a video feed broadcasted to viewers, according to an example of the present disclosure. The present description has been explained in considerable detail with respect to placement of the advertisement in the video feed. However, it will be appreciated that other information in the form of images and videos may also be suitably placed in the video feed. The system 100 may include a receiver 102, a detector 104, a tracker 106, a media obtainer 108, an aligner 110, and a content generator 112.

In an example embodiment, the detector 104 may be in communication with the receiver 102. The media obtainer 108 may be in communication with the detector 104 and the receiver 102. The aligner 110 may be in communication with the scanner, the detector 104 and the receiver 102. The content generator 112 may be in communication with the detector 104, the media obtainer 108, and the aligner 110.

Figure 2:
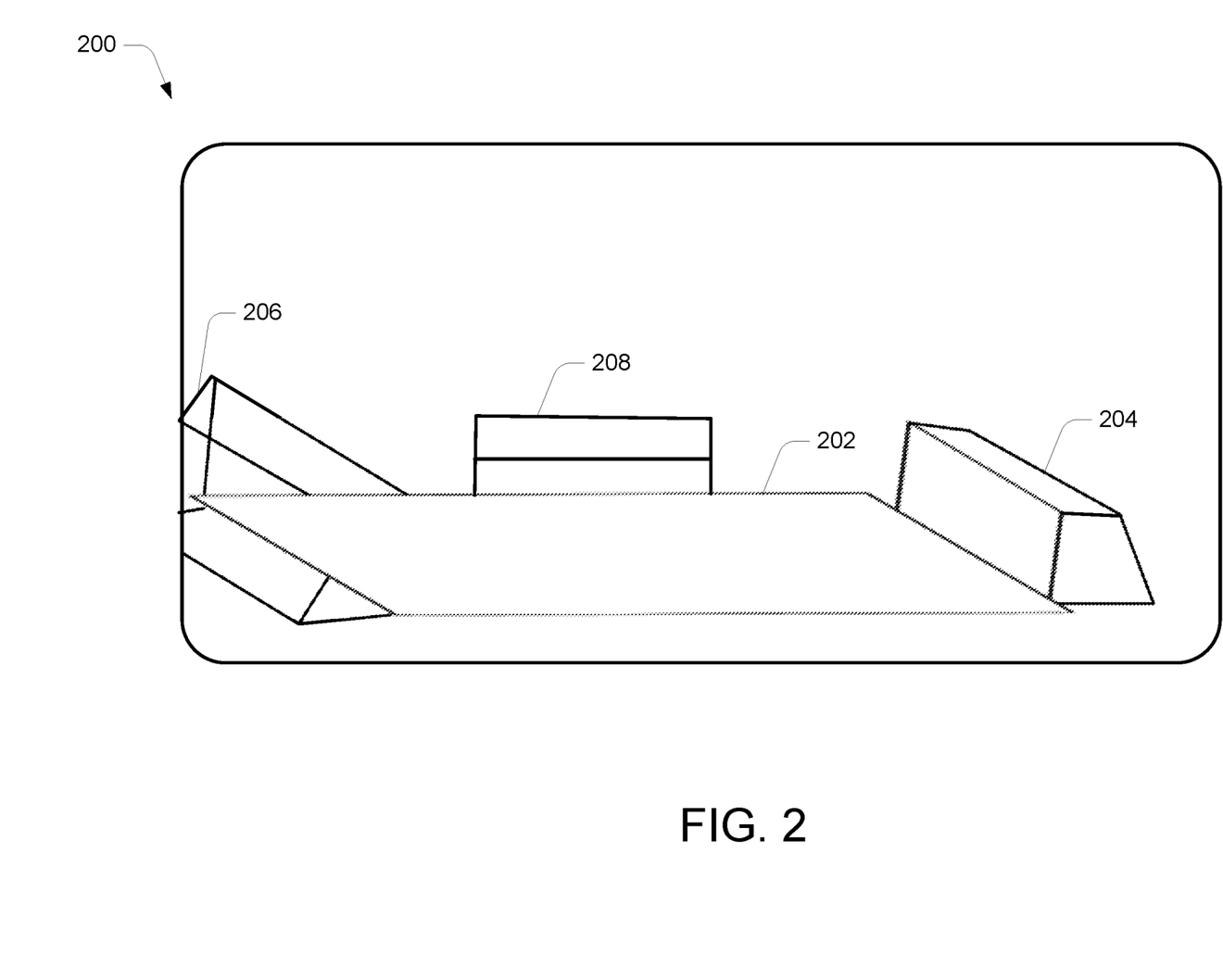
FIG. 2 illustrates an example video feed with a placeholder, according to an example embodiment of the present disclosure.

In an example embodiment, the receiver 102 may receive the video feed. The video feed may be for example a live video feed of an event, such as a match or a concert that is captured by multiple cameras and then broadcasted to the viewers. An example of video feed 200 of a match is illustrated in FIG. 2. The video feed 200 may include a sequence of frames with multiple objects. The objects may include a playground 202, two goal posts 204 and 206, and a banner 208. The video feed 200 may be dynamic in nature where for each frame, position and size of the multiple objects may change due to either movement of the objects within the video feed 200 or movement of a camera capturing the event. For instance, if the camera capturing the match moves rightwards or zooms view, then the position and size of the objects in the video feed 200 may change.

The tracker 106 may receive a camera tracking data that includes change in position and size of an object within the video feed based on movement, tilting or zooming of the multiple cameras. Referring to FIG. 1, the detector 104 may detect an object from amongst the multiple objects in the video feed 200 for placing a placeholder. The placeholder may be placed at any position within the video feed 200, such as, for instance, at a top right position, a top left position, a bottom right position, a bottom left position, or at the center of the video feed 200. The selection of the position for placing the placeholder may be performed manually. In an example, there may be multiple placeholders to be placed in the video feed 200. A set of coordinates may be defined for each placeholder, and an array of data or any other data structure may be used for separation between sets of coordinates during broadcast.

In an example embodiment, the detector 104 may detect the object by using artificial intelligence techniques. In an example, the detector 104 may detect the object 208 for the placeholder. The detector 104 may also detect attributes, such as position and size of the placeholder. In an example, the detector 104 may also receive camera tracking data for the placeholder. The camera tracking data may be related to camera orientation, tilt, pan or zoom during capturing of the event and may allow determining change in size and orientation of objects within the video feed 200.

In an example embodiment, the detector 104 may detect the placeholder in different frames of the video. Based on the detection and order of the frames, the detector 104 may track the placeholder in the video feed 200. The placeholder in the different frames may be tracked, based on a comparison of coordinates of the placeholder in the different frames. In an example embodiment, the detector 104 may track the movement of the placeholder in the video feed 200 to ensure a smooth and consistent animation of the media object to be positioned in the placeholder. In an example embodiment, the detector 104 may highlight at least one zone by the placeholder for placing the media object in a frame of the video feed 200. In an example, the at least one zone may be highlighted in form of a semi-transparent rectangle. For instance, the object 208 may be highlighted semi-transparent.

In an example embodiment, the media obtainer 108 may obtain information regarding the media object. The information may include size and position of the media object, where the size and position may be coordinates of the media object. In an example, the media object may have a placement attribute that includes information related to characteristic of the media object compatible with the placeholder. For instance, size of the media object being smaller than the size of the placeholder based on coordinates of size and position of the media object and the placeholder. The placement attribute may be adjusted to fit the advertisement into the placeholder.

In an example embodiment of the present disclosure, as the size and position of the objects within the video feed 200 keeps changing due to the movement of either the camera, or the objects, the size and position of the placeholder may also change. The media object may have to be adjusted as per changing size and position of the placeholder. The aligner 110 may adjust the placement attribute of the media object with the attributes of the placeholder to position the media object within the placeholder. For instance, the placement attribute of size may be adjusted based on size of the placeholder when the video feed is played and the size of the placeholder keeps changing.

In an example, the aligner 110 may extract coordinates of position and size of the media object and the placeholder and then apply a transformation matrix to the coordinates of position and size of the media object for alignment. A corresponding equation may be defined as: $M \cdot P_i = P'_i$, where M is the transformation matrix and is given as:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{bmatrix}$$

$$P_i = \begin{bmatrix} x_i \\ y_i \\ z_i \\ 1 \end{bmatrix}$$

is origin point of coordinates for the media object and $$P'_i = \begin{bmatrix} x'_i \\ y'_i \\ z'_i \\ 1 \end{bmatrix}$$

is destination point of coordinates for the media object. In an example, the position of every point may be extrapolated based on the value of M. The transformation to apply to media object may be determined based on positions of edges based on a Direct Linear Transformation (DLT) technique. The DLT technique may be used to formulate a homogenous linear system of equations and solve the equations by finding an approximate null space of a system matrix. For example, with 4 corners a,b,c,d, of each of the media object and the placeholder, six vectors may be defined to resolve and test the matrix M. The vectors may be given as: $\vec{ab}, \vec{bc}, \vec{cd}, \vec{da}, \vec{ac}, \vec{bd}$ In an example, $P'_i$ is computed based on a world-to-camera projection that refers to a mapping of real world scene with an image captured by the camera. In an example, the camera used may be a calibrated camera to reduce erroneous or ambigious readings. The mapping may be performed based on an image projection approximation with a pinhole camera. For a fixed and static camera, the position of the placeholder may be computed based on calibration of the camera and may be given as:

$$P'_i = \begin{pmatrix} 0 \\ 0 \\ 0 \\ 1 \end{pmatrix}.$$

However, the camera may not be static and may move, rotate or zoom. The camera may have motion sensors emebedded within to detect the motion and rotation of the camera. To apply the movement, or the rotation of the camera to the projection, a matrix may be defined corresponding to the movement and rotation of the camera. For example, rotation may be defined as a 3 by 3 matrix R and the position of the camera may be defined as a point in a 3-Dimensional space t. The 4 by 4 world-to-camera matrix is given as:

$$P = \begin{bmatrix} R_{00} & R_{01} & R_{02} & t_x \\ R_{10} & R_{11} & R_{12} & t_y \\ R_{20} & R_{21} & R_{22} & t_z \\ 0 & 0 & 0 & 1 \end{bmatrix}$$

The matrix may be applied to the projection to reflect the movement of the camera. In an example, the value of P may be computed in real time.

In an example embodiment, the media object of dimensions 800×200 coordinates may be mapped with the placeholder. For obtaining, the transformation based on the DLT technique, a function, such as getPerspectiveTransform function from a library of programming functions for real-time computer vision, such as may be executed. The execution may provide four point coordinates for the media object as (0,0), (800,0), (0,200) and (800, 200) and four point coordinates of the placeholder as (−155, 550), (635, 610), (−155, 750) and (635, 815) and resultant transformation matrix as:

$$M = \begin{bmatrix} 0.968 & 0.056 & 0 & -155 \\ 0 & 1 & 0 & 550 \\ 0 & 0 & 1 & 0 \\ 0 & 0 & 0 & 1 \end{bmatrix}$$

Based on the transformation matrix generated, the attributes of the media object may be adjusted as per the placeholder. The content generator 112 may receive the video feed 200 to be broadcasted along with the media object that is to be placed within the placeholder. In an example embodiment of the present disclosure, the content generator 112 may generate the video feed 200 with the media object embedded within the placeholder of the video feed 200. The video feed 200 so generated by the content generator 112 may have the media object embedded within the placeholder such that the media object may be positioned within the placeholder when the video feed 200 is broadcasted to a viewer at viewer's home. The working of the system 100 is explained in further details with respect to subsequent figure descriptions.

Figure 3:
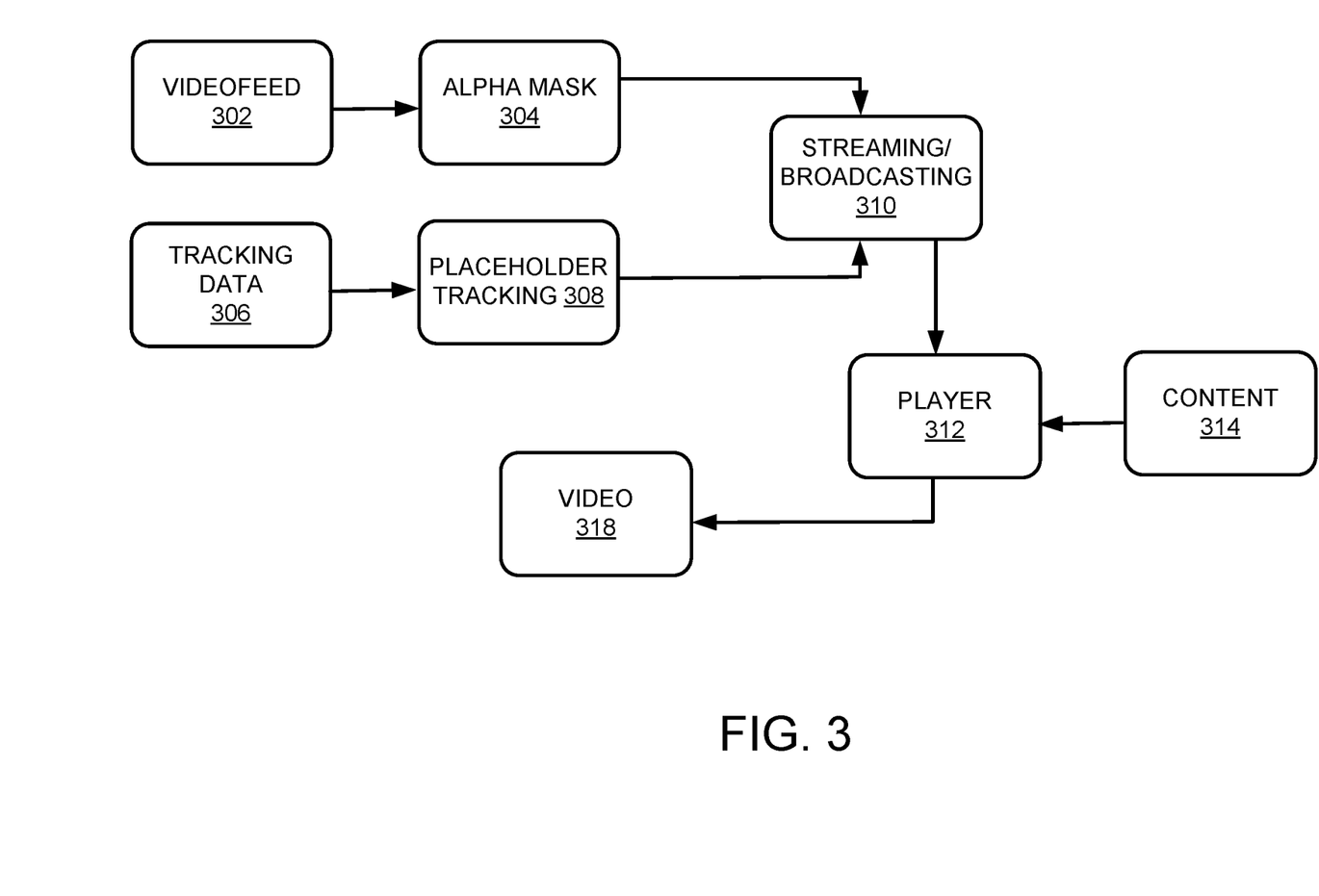
FIG. 3 illustrates working of the system 100, according to an example embodiment of the present disclosure.

FIG. 3 illustrates the working of the system 100 with additional components, according to an example embodiment of the present disclosure. The video feed 200 may be, in an example, tailored and customized with respect to the interests and preferences of each viewer and each household. The video feed 200 may be tailored based on viewer profiling to make the advertisement more relevant to the viewer. For the viewer profiling, social media data of the viewer may be tracked either directly or through third party vendors and Application Programming Interfaces (API) for identifying interests of the viewer. Additionally, history of previous videos watched by the viewer may also be tracked. Based on this data, a suitable advertisement may be selected for broadcasting to the viewer. Likewise, data for a group of viewers of one house may also be tracked to identify advertisements that may be targeted to such group of viewers. In an example, distinct advertisements may be identified and targeted to different viewers or households based on the data. Based on the data, a translation of the advertisement and content of the video feed 200 may also be performed for the viewer.

Thereafter, an alpha mask 304 may be created and applied for occlusions over the placeholder within the video feed 200. The occlusions may be for instance, when people, objects or vehicles pass in front of the placeholder thereby occluding the placeholder. The alpha mask 304 may be utilized for storing and reflecting pixels where the placement of the placeholder may appear. For creating the alpha mask, an original video may be received and an alpha layer may be created. The alpha layer for instance may be to detect the region of the placeholder. Thereafter, the original video may be blended with the alpha layer. The resultant video has identification of the placeholder within the video where the advertisement is to be placed. The identification may be for instance in form of a grey region within the video feed.

In an example, camera tracking data 306 may also be used for determining the attributes of the placeholder. The camera tracking data 306 may include mechanical tracking data for changes in position of a camera capturing an event. The camera for instance may be mounted with a head tracking device. Additionally, the camera tracking data 306 may include virtual tracking data where the video may be analyzed with computer vision techniques to detect camera movements. One such computer vision technique includes chroma keying, where a key color may be detected by computing distance between chroma values and values of a tested pixel, then an alpha value is set as a linear to that difference. In an example, a formula for chroma keying is defined as:

$$\text{chroma}_{key} = \begin{bmatrix} Cb_{key} \\ Cr_{key} \end{bmatrix};$$

$$\text{chroma}_{test} = \begin{bmatrix} Cb_{test} \\ Cr_{test} \end{bmatrix},$$

where, Cb is a blue chroma component and Cr is a red chroma component. The distance may be computed as:

$$\text{distance} = [\text{chroma}_{key} - \text{chroma}_{test}].$$

The computer vision techniques may also be used to track and detect occlusions over an area of interest, such as the banners around the playground 202.

The camera tracking data 306 may then be used for placeholder tracking 308. The placeholder tracking 308 may be performed based on coordinates that define boundary of the placeholder. The coordinates may change with camera movement, however the placeholder may appear steady in the video feed 200 for varying current camera configuration. Based on the camera tracking data 306, the placeholder that may have been predefined, for example, the banners may also be tracked. Thereafter, the video feed 200 may be sent for streaming or broadcasting at block 310. The video feed 200 may be streamed or broadcasted using a player 312. The player 312 may be an Internet browser that may decode the video feed 200 with block alpha channel to be played for the viewer.

In an example, an encoded video with a video compression, for instance VP8, in a WebM format, has colors encoded with three channels, YCbCr, where Y is a luma component, Cb and Cr are chroma components. An additional block of data in the WebM container may be filled with an alpha component corresponding to the alpha layer. Thereafter, a flag, for instance, an alpha mode may be enabled for the video feed 200.

The content 314 may then be provided to the player 312. The content 314 may be the advertisement that has been selected for the viewer and the advertisement has varying attributes for each frame of the video feed 200 to fit into the varying size and position of the placeholder of the video feed 200. The player 312 may then embed the content 314 with the video feed 200 and broadcast as video 318 to the viewer.

Figure 4:
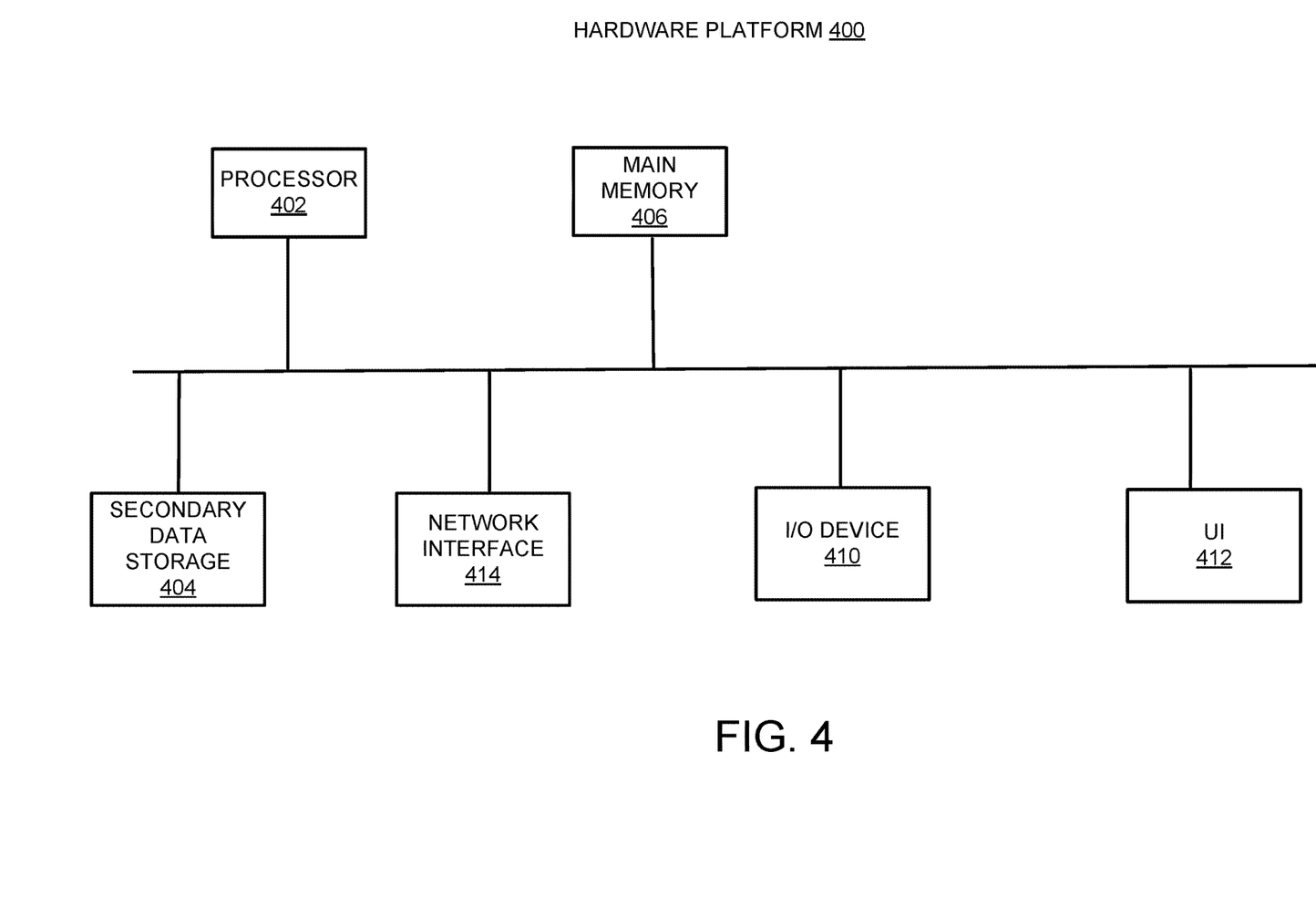
FIG. 4 illustrates a hardware platform for implementation of the system, according to an example of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions, techniques and/or other processes described herein. Commands and data from the processor 402 may be communicated over a communication bus. The computer system 400 may also include a main memory 406, such as a random access memory (RAM), where the machine readable instructions and data for the processor 402 may reside during runtime, and secondary data storage 404, which may be non-volatile and stores machine readable instructions and data. The memory 406 and data storage 404 are examples of non-transitory computer readable mediums. The memory 406 and/or the secondary data storage 404 may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5:
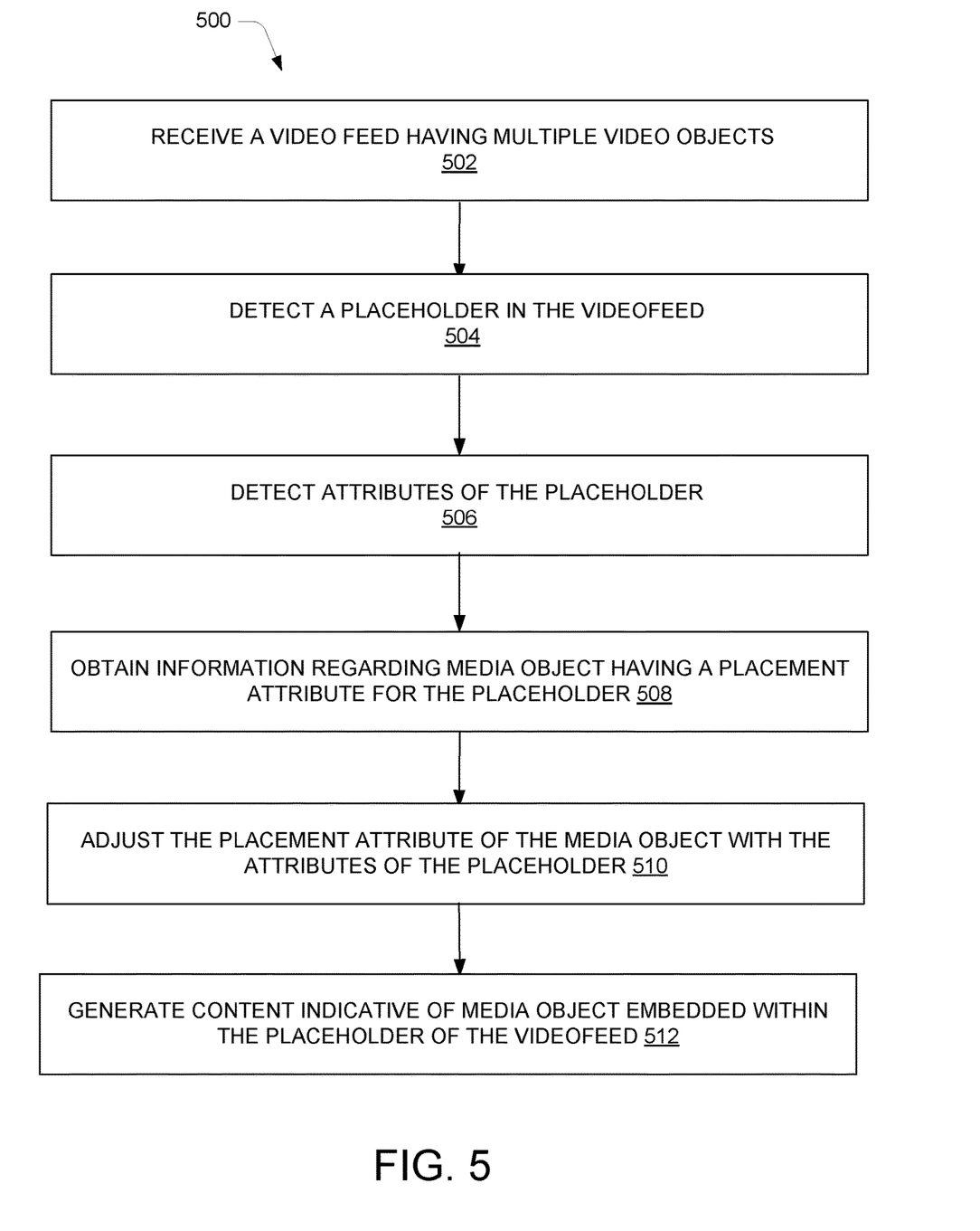
FIG. 5 illustrates a computer-implemented method depicting functionality of the system, according to an example embodiment of the present disclosure.

FIG. 5 illustrates a computer-implemented method 500 depicting functionality of the system 100, according to an example of the present disclosure. For the sake of brevity, construction and operational features of the system 100 which are explained in detail in the description of FIG. 1, FIG. 2, FIG. 3, and FIG. 4 are not explained in detail in the description of FIG. 5.

At block 502, the method 500 commences with receiving the video feed. In an example, the video feed may be a live video feed and may include multiple objects, such as a banner, a billboard, a playground, a stadium.

At block 504, a placeholder may be detected in the video feed. In an example embodiment, the detector 104 may detect the placeholder within an object from amongst the multiple objects in the video feed.

At 506, attributes of the placeholder, such as position, size may be detected. The attributes may be detected by the detector 104. At 508, information regarding the media object may be obtained. The media object in an example may be an advertisement and may have a placement attribute for the placeholder. In an example embodiment, the media obtainer 108 may obtain the information regarding the media object having the placement attribute. The placement attribute may be, for instance, size or position of the media object that may be compatible with the size and position of the placeholder.

At 510, the placement attribute of the media object may be adjusted with the attributes of the placeholder. For example, if the size of the placeholder changes from medium to small then the size of the advertisement may also change from medium to small. In an example, the aligner 110 may adjust the placement attribute of the media object based on the attribute of the placeholder.

At 512, content may be generated. The content having the media object embedded within the placeholder of the video feed. In an example embodiment, the content generator 112 may generate the content, such as the video 318, with the media object embedded within the placeholder of the video feed.

Figure 6:
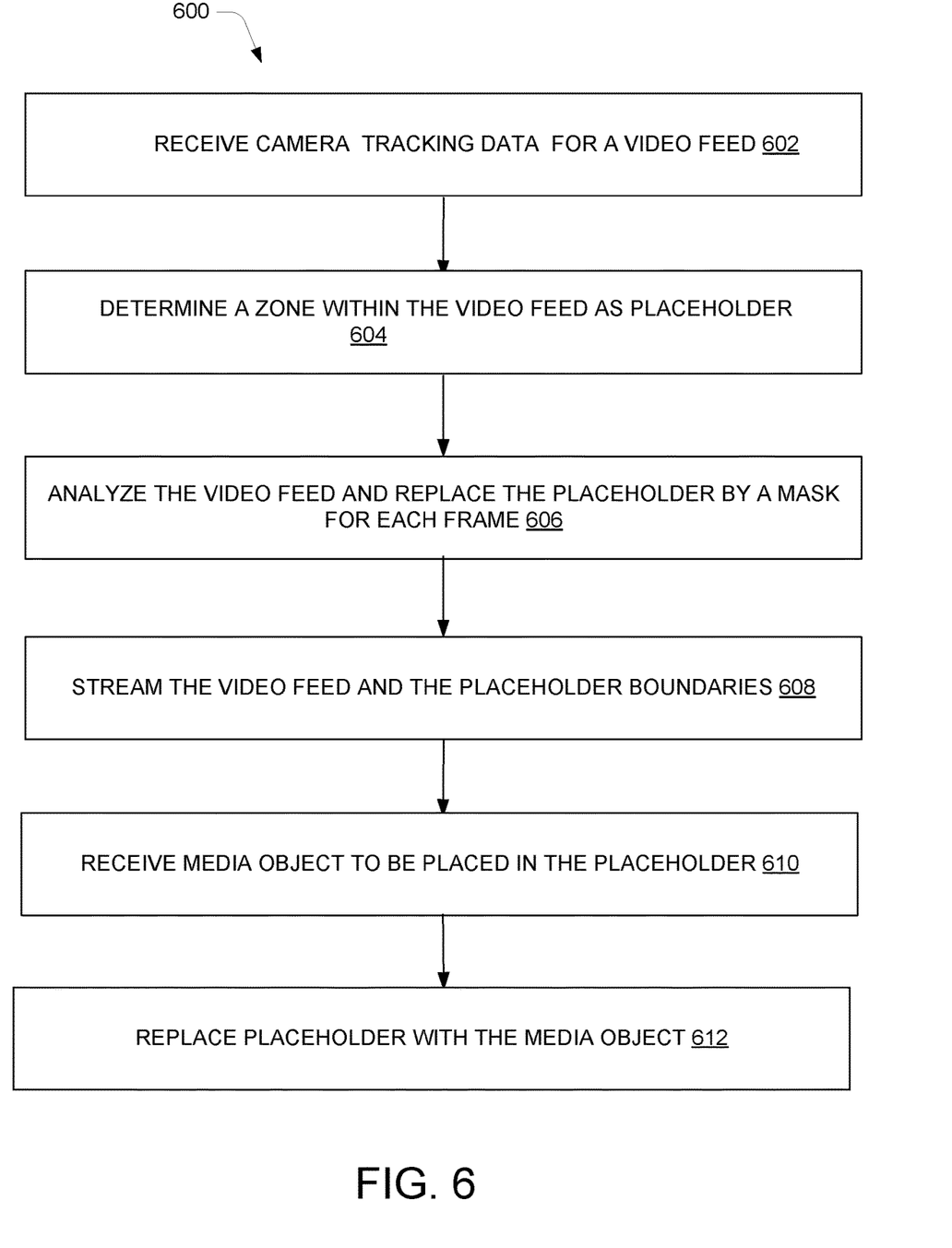
FIG. 6 illustrates a computer-implemented method depicting functionality of the system, according to another example embodiment of the present disclosure.

FIG. 6 illustrates a computer-implemented method 600 depicting the functionality of the system 100, according to another example embodiment of the present disclosure. For the sake of brevity, construction and operational features of the system 100 which are explained in detail in the description of FIG. 1, FIG. 2, FIG. 3, FIG. 4, and FIG. 5 are not explained in detail in the description of FIG. 6.

At block 602, the method 600 commences with receiving the camera tracking data for the video feed. The camera tracking data may be related to position and movement of a camera capturing the video feed. The camera tracking data may also indicate whether the camera has been tilted or zoomed. In an example, the camera tracking data may be received based on one of a mechanical tracking and a virtual tracking. In the mechanical tracking, multiple sensors may be mounted on the camera to detect movement and rotation of the camera, and in the virtual tracking the video feed may be analyzed based on computer vision techniques to detect movements of the camera.

At block 604, a zone may be determined within the video feed for placement of the placeholder. In an example, the detector 104 may detect the zone for the placement of the placeholder in the video feed. For detecting the zone, coordinates that define boundaries of the zone may be determined. The coordinates may change with the movement of the camera such that the zone appears to be steady within the video feed for different position and movement of the camera. At block 606, the video feed may be analyzed and the placeholder may be replaced by a mask for each frame of the video feed. The mask may be either blended into the original video feed within the alpha layer or the mask may be used as a separate data stream. In an example, to handle occlusions, the video feed may be analyzed using computer vision techniques. Thereafter, at block 608, the video feed may be streamed along with placeholder boundaries.

The media object may then be received to be placed in the placeholder at block 610. The media object may be placed in the placeholder by using a third party software that may be available online or offline. The media object may be unique for the viewer. At block 612, the placeholder may be replaced with the media object. In an example embodiment, the content generator 112 may place the media object within the placeholder of the video feed.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
    a receiver to receive a video feed comprising multiple video objects;
    a tracker, coupled to the receiver, to receive a camera tracking data, the camera tracking data indicative of a change in position and size of at least one video object in the video feed;
    a detector in communication with the receiver and the tracker, the detector to,
        detect a placeholder in the video feed based on a position of corners of the placeholder, wherein the placeholder is an area within the video feed for placement of a media object;
        track a movement of the placeholder based on a comparison of coordinates of the placeholder in multiple frames of the video feed;
        highlight at least one zone of the tracked placeholder;
        apply an alpha mask for an occlusion within the video feed; and
        detect an attribute of the placeholder in the video feed, the attribute including at least one of a position, an orientation, a size of the placeholder;
    a media obtainer, in communication with the receiver and the detector, to obtain information regarding the media object, the media object having a placement attribute corresponding to the placeholder in the video feed, wherein the placement attribute is indicative of a characteristic of the media object compatible with the placeholder;
    an aligner in communication with the receiver, the tracker and the detector, the aligner to adjust the placement attribute of the media object with the attribute of the placeholder for positioning the media object within the placeholder, wherein the placement attribute of the media object is adjusted with the attribute of the placeholder based on the at least one highlighted zone of the placeholder; and
    a content generator in communication with the receiver, the detector, the media obtainer, and the aligner to generate a content indicative of the media object embedded within the placeholder of the video feed.

2. The system as claimed in claim 1, wherein the content generator is further to integrate a content enhancement effect to the media object embedded in the video feed, wherein the content enhancement effect includes at least one of a blur effect, a sharpness effect, a saturation effect, a brightness effect, a hue effect, and a contrast effect.

3. The system as claimed in claim 1, wherein the detector is further to monitor changes in the attribute of the placeholder in the video feed based on the camera tracking data.

4. The system as claimed in claim 3, wherein the aligner applies the changes to the placement attribute of the media object based on a transformation matrix.

5. The system as claimed in claim 1, wherein the detector detects the placeholder based on edge coordinates of the placeholder.

6. The system as claimed in claim 1, wherein the detector is to further track and detect the occlusion over an area within the video feed based on chroma keying.

7. The system as claimed in claim 1, wherein the media object is an advertisement.

8. The system as claimed in claim 1, wherein the video feed is a live video feed.

9. A method comprising:
receiving a video feed comprising multiple video objects;
receiving a camera tracking data, the camera tracking data indicative of a change in position and size of at least one video object in the video feed;
detecting a placeholder in the video feed based on a position of corners of the placeholder, wherein the placeholder is an area within the video feed for placement of a media object;
tracking a movement of the placeholder based on a comparison of coordinates of the placeholder in multiple frames of the video feed;
highlighting at least one zone of the tracked placeholder;
applying an alpha mask for an occlusion within the video feed;
detecting an attribute of the placeholder in the video feed, the attribute including at least one of a position, an orientation, a size of the placeholder;
obtaining information regarding the media object, the media object having a placement attribute corresponding to the placeholder in the video feed, wherein the placement attribute is indicative of a characteristic of the media object compatible with the placeholder;
adjusting the placement attribute of the media object with the attribute of the placeholder for positioning the media object within the placeholder, wherein the placement attribute of the media object is adjusted with the attribute of the placeholder based on the at least one highlighted zone of the placeholder; and
generating a content indicative of the media object embedded within the placeholder of the video feed.

10. The method as claimed in claim 9 comprising integrating a content enhancement effect to the media object embedded in the video feed, wherein the content enhancement effect includes at least one of a blur effect, a sharpness effect, a saturation effect, a brightness effect, a hue effect, and a contrast effect.

11. The method as claimed in claim 9, comprising monitoring changes in the attribute of the placeholder in the video feed based on the camera tracking data.

12. The method as claimed in claim 9 comprising applying the changes to the placement attribute of the media object based on a transformation matrix.

13. The method as claimed in claim 9, wherein the placeholder is detected based on edge coordinates.

14. The method as claimed in claim 9 further comprising detecting the occlusion over an area within the video feed based on chroma keying.

15. The method as claimed in claim 9, wherein the media object is an advertisement.

16. The method as claimed in claim 9, wherein the video feed is a live video feed.

17. A non-transitory computer readable medium comprising instructions executable by a processor to:
receive a video feed comprising multiple video objects;
receive a camera tracking data, the camera tracking data indicative of a change in position and size of at least one video object in the video feed;
detect a placeholder in the video feed based on a position of corners of the placeholder, wherein the placeholder is an area within the video feed for placement of a media object;
track a movement of the placeholder based on a comparison of coordinates of the placeholder in multiple frames of the video feed;
highlight at least one zone of the tracked placeholder;
apply an alpha mask for an occlusion within the video feed;
detect an attribute of the placeholder in the video feed, the attribute including at least one of a position, an orientation, a size of the placeholder;
obtain information regarding the media object, the media object having a placement attribute corresponding to the placeholder in the video feed, wherein the placement attribute is indicative of a characteristic of the media object compatible with the placeholder;
adjust the placement attribute of the media object with the attribute of the placeholder for positioning the media object within the placeholder, wherein the placement attribute of the media object is adjusted with the attribute of the placeholder based on the at least one highlighted zone of the placeholder; and
generate a content indicative of the media object embedded within the placeholder of the video feed.

18. The non-transitory computer readable medium as claimed in claim 17 comprising instructions to integrate a content enhancement effect to the media object embedded in the video feed, wherein the content enhancement effect includes at least one of a blur effect, a sharpness effect, a saturation effect, a brightness effect, a hue effect, and a contrast effect.

19. The non-transitory computer readable medium as claimed in claim 17 comprising instructions to monitor changes in the attribute of the placeholder in the video feed based on the camera tracking data.

20. The non-transitory computer readable medium as claimed in claim 17 comprising instructions to apply the changes to the placement attribute of the media object based on a transformation matrix.

* * * * *

UNITED STATES PATENT AND TRADEMARK OFFICE
CERTIFICATE OF CORRECTION

PATENT NO.       : 10,674,207 B1
APPLICATION NO.  : 16/242891
DATED            : June 2, 2020
INVENTOR(S)      : Richard Vidal et al.

Page 1 of 1

It is certified that error appears in the above-identified patent and that said Letters Patent is hereby corrected as shown below:

On the Title Page

At Item (30), Foreign Application Priority Data "18214595" should be "18214595.3".

Signed and Sealed this
Eleventh Day of May, 2021

Drew Hirshfeld
*Performing the Functions and Duties of the
Under Secretary of Commerce for Intellectual Property and
Director of the United States Patent and Trademark Office*